April 24, 1951  J. E. ORTLOFF ET AL  2,550,373
FLUID PRESSURE OPERATED CLUTCH

Filed Aug. 18, 1947  2 Sheets-Sheet 1

INVENTORS
J. ORTLOFF
W. WOODY
BY
C. M. McKnight

April 24, 1951   J. E. ORTLOFF ET AL   2,550,373
FLUID PRESSURE OPERATED CLUTCH
Filed Aug. 18, 1947   2 Sheets-Sheet 2

INVENTORS
J. ORTLOFF
W. WOODY
BY
C. M. McKnight

Patented Apr. 24, 1951

2,550,373

UNITED STATES PATENT OFFICE 2,550,373

FLUID PRESSURE OPERATED CLUTCH

John E. Ortloff and Wayland B. Woody, Tulsa, Okla., assignors to Franks Manufacturing Corporation, Tulsa, Okla., a corporation of Oklahoma Application August 18, 1947, Serial No. 769,240

5 Claims. (Cl. 192—86)

This invention relates to a clutch mechanism of the friction plate type and more particularly, but not by way of limitation, to improvements in an air-controlled clutch actuator mechanism adapted for use with the clutch mechanism of a rotary draw works of rotary drilling rigs for oil wells.

This invention is an improvement over the A. E. Masek Patent #2,342,880, issued February 29, 1944, and relates generally to an air-controlled actuator mechanism comprising a cylinder cooperating with a pair of spaced stationary hollow piston shafts, and movement relative thereto to cause simultaneous movement of a linkage mechanism actuating a pair of friction rings into engagement and disengagement with a clutch plate for the draw works.

It is an important object of this invention to provide a clutch mechanism for use on rotary draw works which will substantially eliminate rotating air seals by mounting the actuating cylinder in such a manner to preclude rotation thereof, yet permitting a rotating connection between the actuating cylinder and the clutch mechanism.

And still another object of this invention is to provide an air-controlled actuator for clutch mechanisms which may be easily and positively adjusted for stroke position from an external position of the actuating cylinder.

And still another object of this invention is to provide a piston actuating device for clutch mechanisms wherein the piston cups and the packings therefor are only subject to reciprocating motion during engagement and disengagement of the clutch mechanism, and thus eliminating any rotational wear on the cups and packings tending to cause rapid deterioration and subsequent inefficiency.

And still another object of this invention is to provide an air-controlled piston actuator for clutch mechanisms wherein the actuating mechanism is disposed away from the friction surfaces of the clutch mechanism and consequently avoids the friction heat therefrom.

And still another object of this invention is to provide an air-controlled actuator for rotary rig clutch mechanisms wherein an equalized pressure is provided to the clutch engaging surfaces to insure an efficient and smooth operation of the clutch members and thus eliminate considerable wear thereof.

And still another object of this invention is to provide a fluid-controlled actuator for clutch mechanisms having a slidable cylinder co-operating with rotating clutch members through the medium of a plurality of clutch dogs adapted to effectively cause engagement and disengagement of the clutching members.

And still another object of this invention is to provide a fluid-controlled actuator for clutch mechanisms wherein the exhaust fluid discharging from the actuator is slowed down or decreased to effect a shock-absorbing or cushioning of the actuator in one movement thereof causing a disengagement of the clutch mechanism.

Other objects and advantages of the invention will be evident from the following detailed description read in conjunction with the accompanying drawings which illustrate our invention.

Figure 1:
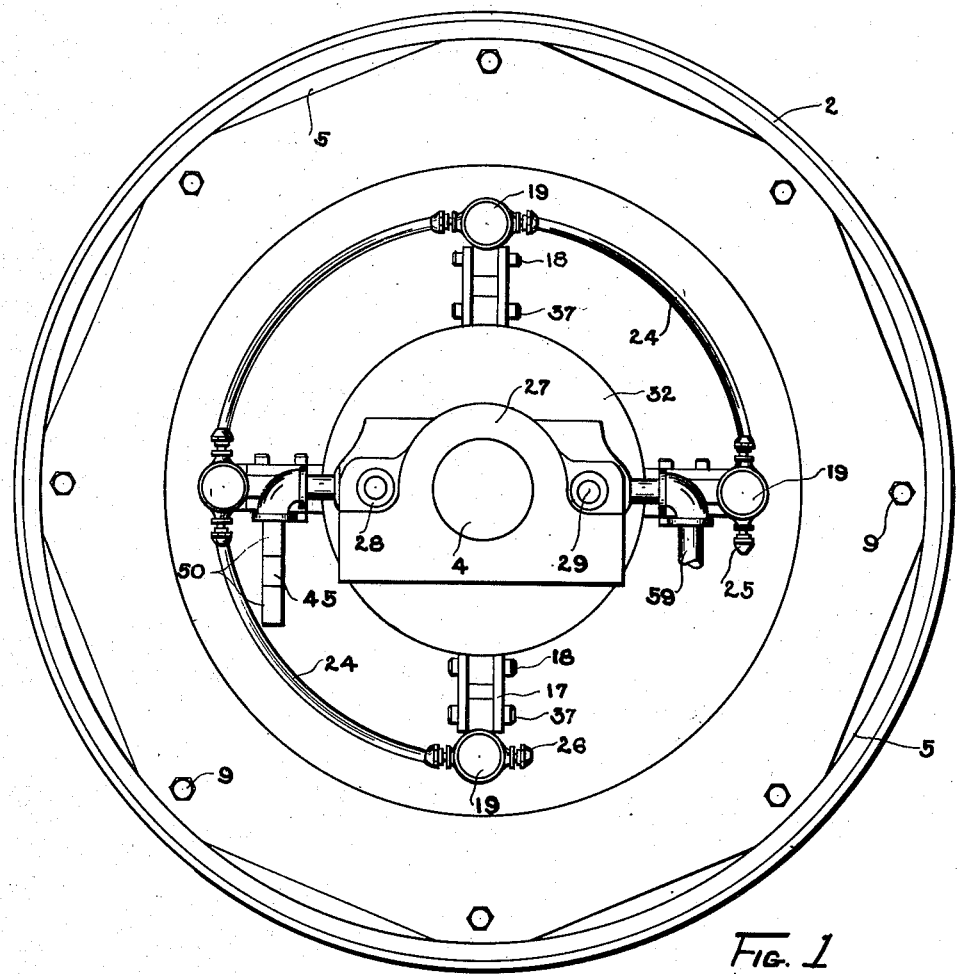
Figure 1 is a front elevational view of the actuator utilized with a clutch mechanism.

Referring to the drawings in detail, reference character 2 indicates a clutch drum which is rotatably mounted through bearings 3 on a stationary shaft 4 of the draw works of a rotary drilling rig (not shown). The drum 2 is driven by any suitable means (not shown). The drum is provided with an outwardly extending annular edge flange 5. An annular friction plate 6 is disposed parallel to the drum 2 and is provided with friction surfaces 7 and 8 for a purpose as will be hereinafter set forth. The friction plate 6 is secured to the annular flange portion 5 by any suitable bolt means 9 threaded into the drum flange 5. A pair of driving plates or inner and outer annular rings 10 and 12 are disposed at opposite sides respectively of the friction plate 6. The friction plates 10 and 12 are rotatable relative to the stationary shaft 4 and are adapted to be moved in opposite directions toward each other to engage the friction surfaces 7 and 8 of the friction plate 6 for engaging the clutch members, and also are adapted to move away from the friction plate 6 for disengaging the clutch mechanism. The inner friction ring 10 is provided with a plurality of arms 13 circumferentially spaced and extending forwardly through the group of clutch plates to a point adjacent the front face or bearing surface 14 of the outer driving plate 12.

A clutch dog link 15 is pivotedly connected to the end of each of the arms 13 through pivot pin 16, and its opposite end is pivoted to a link 17 through a pivot pin 18, as will be hereinafter set forth. Each of the clutch dog links is provided with a hollow cylinder 19 open at its inner end 20 (not shown) and closed at its outer end 21. A cylindrical piston 22 is disposed in each of the hollow cylinders 19 and has a rounded outer face 23 adapted to contact the bearing surface 14 in a manner as will be hereinafter set forth. As clearly shown in Figure 1, the cylinders 19 are in communication with each other through a plurality of interconnecting flexible tubes 24 connecting the cylinders 19 in series. A cylinder at one end of the series is provided with a fitting 25 permitting the introduction of any suitable pressure fluid into the hollow cylinders 19 to maintain equalized pressure at all points of contact of the pistons 22. A drain cock valve 26 may be provided at the opposite end of the cylinder series in order to adjust or vary the hydraulic pressure maintained throughout the cylinders 19 in a manner similar to the aforementioned Patent #2,342,880. It will be apparent that pressure fluid such as grease, from any suitable source (not shown) may be used in the connecting conduits 24 for each of the cylinders 19.

A substantially circular pillow box 27 is disposed in front of the clutch mechanism and may be mounted by any suitable bracket support means (not shown). The stationary shaft 4 extends through the pillow box 27, as clearly shown in Figures 4 and 5. Also shown in Figure 1, the pillow box is provided with a pair of horizontally spaced hollow piston rods 28 and 29, for a purpose that will be hereinafter set forth. A drive hub 30 is rotatably mounted on the stationary shaft 4 through a bushing 31 by a connection (not shown) with the friction plates. A non-rotatable annular sleeve 38 is disposed on the shaft 4 above drive hub 30 and supports a cylinder 32 acting as a piston cylinder for the hollow piston shafts in a manner as will be hereinafter set forth. A pin 39 secures the sleeve 38 to the shaft 4. A nut 39' is interposed between the pill box 27 and the sleeve 38. The outer periphery of the cylinder 32 is provided with spaced peripheral flanges 33 against which are abutting ball bearing members 34 supporting an outer annular race member 35. The race is provided with enlarged bearing portion 36 connecting with the link 17 through a pivot pin 37. It will be apparent that the race 35 is rotatable with the rotatable clutch drum 2 through the linkage connections as heretofore set out. The cylinder 32 is provided with an annular bore 40 having an apertured end 41 through which extend the horizontally spaced hollow piston shafts 28 and 29. As shown in Figure 1, the piston shafts 28 and 29 are horizontally spaced 180 degrees apart at substantially opposite sides of the stationary shaft 2. However in Figures 4 and 5, the shafts 28 and 29 are shown disposed in the pillow box 27 at a point above the shaft 4 for purpose of clarification only. The hollow shafts 28 and 29 extend into the cylinder 32 and each are maintained therein by a suitable packing nut 42 and a lock nut 42' threaded at the opposite end thereof. Any suitable packing 43 is provided to effect a seal of the hydraulic pressure fluid, as will be hereinafter set forth.

The shafts 28 and 29 act as piston rods where one end thereof is reduced in diameter for receiving a piston cup, piston guide and washer, all of these elements being generally indicated by reference character 44. For purposes of clarity only, the upper half portion of the actuating mechanism, and particularly the cylinder 32 and piston unit 44 are disclosed in Figures 4 and 5. It will be apparent that the cylinder 32 is annular and extends around the shaft 4 above and below the pillow box 27. Furthermore, the piston 44 is substantially "doughnut" shaped having an inside and outside diameter, and extends in circular path in the annular bore 40. Each of the piston heads 44 for the stationary rods 28 and 29 are disposed in a cylinder 32 which is slidable relative to the pistons on the sleeve 38. The outer race member 35 is provided with any suitable grease oil seal 46. The hollow piston shafts 28 and 29 extending between the pillow box 27 and the cylinder 32 are secured in the pillow box 27 by suitable lock nuts 47 and 48 having packing 49 to effect a leakage seal around the shafts.

A valve unit 45 is interposed in the inlet conduit 50 supplying pressure fluid for the shaft 28 from the source not shown. The inlet conduit 50 is in communication with an annular passageway 51 in the pillow box 27 adjacent and surrounding the shaft 28 and communicates with an aperture 53 provided in the shaft 28.

Operation

In operation, controlled supply pressure fluid from any suitable source (not shown) is discharged through the valve 45 in a manner as will be hereinafter set forth. The supply fluid pressure passes around the annulus 51 and through the port 53 into communication with the bore 54 of the hollow shaft 28. The supply fluid pressure flows through the bore 54 and is discharged through a port 55 in the shaft 28 and into the bore 40 of the cylinder 32. The pressure is discharged into the bore 40 behind the piston unit 44 adjacent the piston face 56 as noted in Figure 5. Both ends of the shaft 28 are plugged by any suitable means such as a nut 52. Furthermore the shafts 28 and 29 are secured in a rigid relation with the pillow box 27 by the nuts 47 and 48 and consequently are not movable. The supply pressure fluid discharges into the bore 40 behind the face 56 of the piston 44, and as soon as the pressure builds up in the bore 40, the cylinder 32 and the outside race 35 are caused to be moved horizontally relative to the immovable or stationary piston shaft 28.

Figure 5:
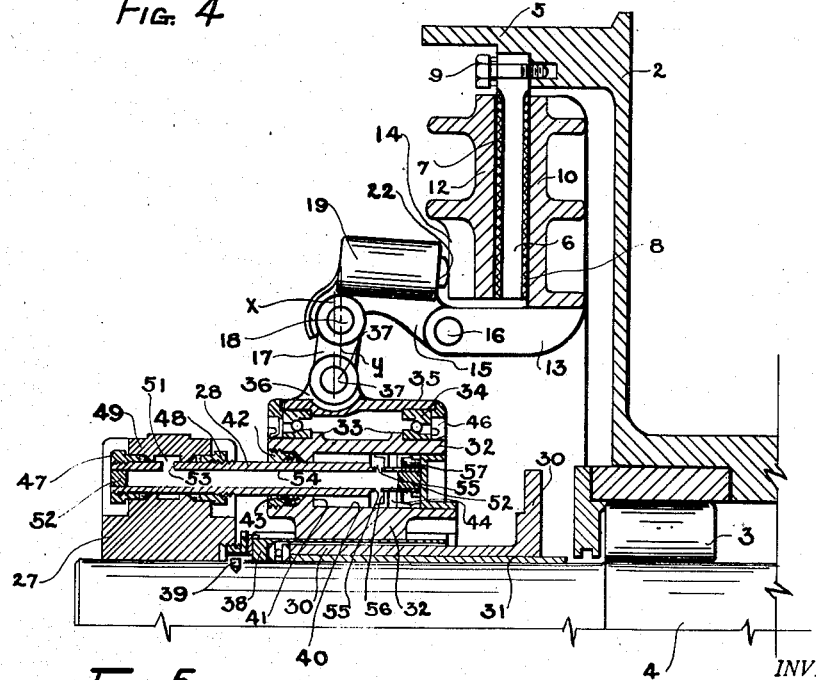
Figure 5 is a similar view showing the actuator engager mechanism causing engagement of the clutch mechanism.

As clearly shown in Figure 5, the supply pressure fluid from bore 54 causes movement of the cylinder 32 in a left hand direction according to the Figure 5, which causes a simultaneous movement of the outer race 35 in the same direction to cause movement of the pivot pin 37 to provide a clockwise rotation to the link 17, pivot pin 18 and link 15. The clockwise rotation of the linkage mechanism will bring the plurality of pistons 22 into engagement with the bearing surface 14 of the outer friction plate 12 causing movement of the outer plate 12 into engagement with the frictional surface 7 of the friction plate 6. The movement of the cylinder 32, above described, will move the center line of the pivot pin 37 to a position slightly past center of the center line of the pivot pin 18, as is clearly shown in Figure 5. The new position of the pivot pin 18 pivoting about the pin 16 forces the piston 22 into engagement with the bearing surface 14. The travel of the cylinder 32 may be adjusted as heretofore mentioned to assure that the pivot pin 37 can be moved to the approximate position past the center line of the pivot pin 17 by adjustment of the shafts 28 and 29 as will be hereinafter mentioned. Simultaneously the link 15 pivoting about the pin 16 will move the arms 13 in a direction to cause movement of the inner plate 10 toward the friction plate 6 and cause engagement with the frictional surface 8 thereof. In this position the actuator mechanism including the piston 44 working with the cylinder 32 and by allowing the past center position of pin 37, has caused the clutch mechanism indicated by the plates 6, 10 and 12 to be positively engaged, and cannot be released until the supply pressure fluid in the bore 40 is released or exhausted, and additional supply pressure fluid is directed to the opposite face 57 of the piston to actuate the cylinder 44 in a reverse direction to permit disengagement of the clutch members.

The outer face of the piston 44 acts as a stop for the cylinder 32 moving in a direction towards the pillow box to cause engagement of the clutch members. It will be apparent that if any adjustment is desired, the stationary piston shafts 28 and 29 can be moved or adjusted by the nuts 47 and 48 relative to the cylinder 32 and the bore 40 to allow such adjustment. The movement of the cylinder is actuated by supply pressure fluid being present on opposite faces of 56 and 57 of the piston dependent upon the flow through a respective hollow shaft 28 and 29.

Figure 4:
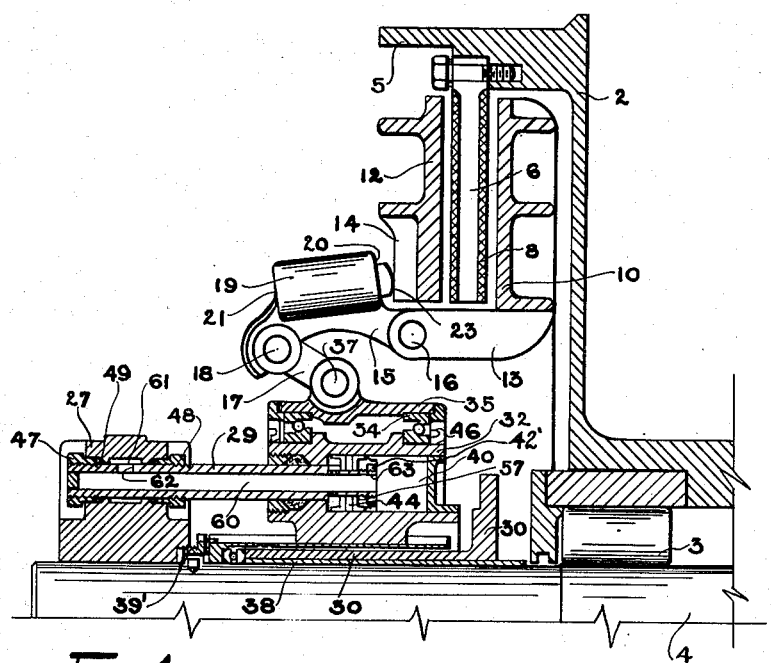
Figure 4 is a sectional elevational view showing the actuating mechanism in disengaging relationship with the upper portion of the clutch mechanism.

As above set forth, the shaft 28 permits discharge of fluid into the bore 40 for actuating the cylinder 32 causing engagement of the clutch members. In similar manner, the spaced hollow shaft 29 is provided with a bore 60 communicating with the controlled source of supply pressure fluid (not shown) from inlet conduit 59 through an annular passageway 61, and port 62. One end of the shaft 29 is closed while the opposite end 63 is open or apertured to permit the discharge of supply pressure fluid into the bore 40 adjacent the piston face 57 of piston 44. As soon as the pressure builds up in the cylinder 32, the cylinder is moved relative to stationary shaft 29 in a right hand direction, as shown in Figure 4, thereby causing a simultaneous movement of the pivot pin 37 which will move the link 17 in a counterclockwise direction, thereby moving the clutch dog link 15 and the cylinder 19 and its co-operating piston 22 away from the bearing surface 14, to disengage the outer plate 12 from the friction plate 6. Movement of the link 15 simultaneously moves the plate 13 through pivot pin 16 in a direction to cause movement of the inner friction ring 10 away from the engagement with the friction plate 6 thereby disengaging the clutch mechanism. As heretofore set forth, the center line designated $x$, in Figure 5, of pivot pin 37 moves past a center line designated $y$ of pivot pin 18 to provide an engaging position of the clutch mechanism. In a disengagement of the clutch mechanism it will be apparent that the center line $x$ of the pivot pin 37 moves to the right or from a past center position relative to the center line $y$ of the pivot pin 18.

Figures 2, 3:
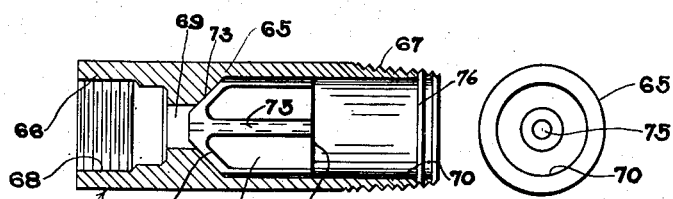
Figure 2 is a detailed view in section of the inlet control valve.
Figure 3 is an end view thereof.

The valve unit 45, shown in detail in Figures 2 and 3, comprises a housing 65 having threads 66 and 67 for securing the housing in the intake conduit 50 communicating with the shaft 28. The housing 65 is provided with a bore having a pressure fluid inlet portion 68 communicating with a reduced portion 69 which in turn communicates with a bore 70 of larger diameter. A fluted piston type valve 71 is provided in the bore 70 and has a tapered point 72 at one end co-operating with a tapered portion 73 of the valve bore 70, and acting as a valve seat therefor. The valve 71 is a solid body provided with circumferentially spaced grooves or fluted portions 74 for a purpose as will be hereinafter set forth. A longitudinal bore 75 is provided in the valve 71. In operation, supply pressure fluid from the inlet conduit 50 communicates with the bores 68 and 69 to move the valve away from its seat 73 wherein the intake fluid can flow by the fluted portions 74, and into the inlet conduit 50 which in turn is in communication with the annular passageway 51 provided in the pill box 27 to flow into the bore 54 of shaft 28. In this manner the valve permits an uninterrupted flow of supply pressure fluid to one face 56 of the cylinder 32. However when supply pressure fluid is directed through the hollow shaft 29 to the opposite face 57 of the piston in cylinder 32, causing a reverse movement of the cylinder 32, the exhaust pressure in bore 40 adjacent the face 56 is exhausted through a port 55, bore 54 into the conduit 50. The exhaust pressure will move the valve 71 against the seat 73. However the small bore 75 will permit a decreased or slower discharge of the exhaust pressure from the bore 54 of shaft 28. A transversely disposed cotter pin 76 or spring is provided in the valve housing 65 at the rear of the valve body 71 in order to limit its backward travel from input pressure fluid.

In this manner, it will be apparent that the exhaust pressure from cylinder 32 is slowed down, and therefor acts as a shock-absorber or cushioning means during the movement of the cylinder 32 causing a disengagement of the clutch mechanism. By using the valve mechanism 45 to bleed the exhaust pressure and provide a cushion or shock-absorber, it will prevent the cylinder from moving in a reverse direction at an increased momentum, which might cause damage to the piston 44 and other working parts. This cushioning effect does not slow down the disengagement or release of the clutch mechanism because the clutch is released as soon as the center line $x$ of pivot pin 37 is again moved past the center line $y$ of pin 18 to cause a simultaneous movement of the linkage mechanism moving the plates 10 and 12 away from the plate 6. A valve of the type designated 45 is not necessary for engaging the clutch mechanism, since considerable force and pressure is required to engage the clutch plates, while only a very small amount of pressure or force would be required to move the cylinder 32 past the center of the pin 18 and release the clutch members.

From the foregoing it will be apparent that the present invention contemplates a clutch mechanism having a hydraulic actuator causing engagement and disengagement of the clutch mechanism in a positive and efficient manner. Furthermore, the actuating apparatus is non-rotating relative to the rotating clutch mechanism and as such, eliminates rotating air seals. The alternate movement of the clutch mechanism by selective supply pressure fluid permits operation of the clutching mechanism in such a manner that the flow of the pressure fluid is unrestricted in the engaging operation, yet the exhaust of the pressure fluid for the engaging operation is decreased or restricted to provide a cushioning action for the release or disengaging operation of the clutch members.

Changes may be made in the specification and drawings without departing from the spirit of the invention within the scope of the following claims, as set forth.

What we claim is:

1. In a clutch mechanism comprising a friction plate and movable inside and outside driving plates for engagement and disengagement therewith, a hydraulic actuator for the driving plates comprising a movable cylinder, a plurality of clutch dogs pivotedly linked with the outside driving plate and the cylinder, means co-operating with the cylinder to alternately direct supply pressure fluid to the cylinder to cause movement thereof in alternate directions, said pivotable linkage comprising a pair of pivot pins and responsive to movement of the cylinder in one direction to move the center line of one of the said pivot pins past the center line of the other of said pivot pins to move the dogs in a direction to cause engagement of the driving plates with the friction plate.

2. In a clutch mechanism comprising a friction plate and movable driving plates for engagement and disengagement therewith, a hydraulic actuator for the clutch mechanism comprising a movable cylinder, a plurality of piston dogs pivotedly linked with the cylinder and one of the driving plates to cause movement of the driving plates into and out of contact with the friction plate, a plurality of hollow stationary piston rods having a piston flange disposed in the cylinder, means directing supply pressure fluid through one of the rods to one face of the flange to cause movement of the cylinder in one direction, providing engagement of the driving plates with the friction plate, and means directing supply pressure fluid through the other of said rods to the opposite face of the piston flange to cause movement of the cylinder in an opposite direction causing movement of the driving plates away from the friction plate, and valve means interposed in the first mentioned piston rod to cushion the movement of the cylinder in its last mentioned direction.

3. In a clutch mechanism comprising a friction plate and movable driving plates for engagement and disengagement therewith, a hydraulic actuator for the driving plates comprising a movable cylinder, a plurality of clutch dogs pivotedly linked with one of the driving plates and the cylinder, a stationary piston flange disposed in the cylinder, means directing supply pressure fluid to one face of the piston flange to cause movement of the cylinder in a direction to cause a movement of the clutch dogs with a simultaneous movement of the driving plates into engagement with the friction plate, means directing supply pressure fluid to the opposite face of the piston flange to cause movement of the cylinder in an opposite direction causing a disengagement of the driving plates with the friction plate, and valve means co-operating with the first mentioned means permitting free-flow of supply pressure fluid to the first mentioned face of the piston flange, said valve means dampening the exhaust of said pressure fluid from the first mentioned flange face to provide a cushioning effect to the movement of the cylinder in the disengaging operation.

4. In combination with a clutch mechanism, a hydraulic actuator therefor, and pivotal link members connecting the actuator and clutch mechanism, said actuator comprising a movable cylinder, a plurality of hollow stationary piston rods having a piston flange disposed in the cylinder, means directing supply pressure fluid through the rods to one face of the flange to cause movement of the cylinder in one direction, said pivotal linking mechanism comprising a pair of cooperating pivot pins connected with the cylinder and responsive to the movement of the cylinder in one direction, to move the center line of one of said pivot pins past the center line of the other of said pivot pins to effect an increased locking by the linkage mechanism relative to the clutch mechanism, and means directing supply pressure fluid through the other of said rods to the opposite face of the piston flange to cause movement of the cylinder in an opposite direction to the first mentioned direction for moving the pivot pins in a retrograde movement relative to the center lines thereof.

5. In a hydraulic actuator mechanism adapted to actuate a clutch mechanism having engaging and disengaging plate members, and comprising a movable cylinder, a plurality of hollow stationary piston rods having a piston flange disposed in the movable cylinder, means directing supply pressure fluid through one of said rods to cause slideable movement of the cylinder in one direction, means for directing pressure fluid through the other of said rods to cause slideable movement of the cylinder in an opposite direction, and means including a valve cooperating with one of said rods to permit a free flow of supply pressure fluid through the first mentioned rod in one direction, said valve means dampening the exhaust of said pressure fluid through the first mentioned rod in a movement of the cylinder in an opposite direction to the first mentioned direction.

JOHN E. ORTLOFF.
WAYLAND B. WOODY.

REFERENCES CITED

The following references are of record in the file of this patent:

UNITED STATES PATENTS

| Number | Name | Date |
| --- | --- | --- |
| 41,586 | Wright | Feb. 9, 1864 |
| 423,333 | Medart | Mar. 11, 1890 |
| 1,844,935 | Hinger | Feb. 16, 1932 |
| 1,865,090 | Donovan | June 28, 1932 |
| 2,039,128 | Tiedmann | Apr. 28, 1936 |
| 2,120,798 | Criley | June 14, 1938 |
| 2,342,880 | Masek | Feb. 29, 1944 |
| 2,388,857 | Lindsley | Nov. 13, 1945 |